(12) United States Patent
Kim

(10) Patent No.: US 10,207,286 B1
(45) Date of Patent: Feb. 19, 2019

(54) FOAM DISPENSER HAVING TWICE AUTOMATIC CLEANING FUNCTION

(71) Applicant: Hyung Goo Kim, Goyang-si (KR)

(72) Inventor: Hyung Goo Kim, Goyang-si (KR)

(*) Notice: Subject to any disclaimer, the term of this patent is extended or adjusted under 35 U.S.C. 154(b) by 0 days.

(21) Appl. No.: 15/670,586

(22) Filed: Aug. 7, 2017

(51) Int. Cl.
  *B05B 15/555* (2018.01)
  *B05B 7/00* (2006.01)
  *B05B 7/04* (2006.01)
  *B05B 12/00* (2018.01)

(52) U.S. Cl.
  CPC .......... *B05B 15/555* (2018.02); *B05B 7/0031* (2013.01); *B05B 7/0483* (2013.01); *B05B 12/002* (2013.01)

(58) Field of Classification Search
  CPC ... B05B 15/555; B05B 7/0031; B05B 7/0483; B05B 12/002; B05B 15/0258
  USPC ...... 239/106, 112, 113, 398–434.5, 525, 526
  See application file for complete search history.

(56) References Cited

U.S. PATENT DOCUMENTS

| | | | |
|---|---|---|---|
| 3,690,557 A * | 9/1972 | Higgins | .................. B05B 15/55 239/112 |
| 4,311,254 A | 1/1982 | Harding | |
| 4,399,930 A | 8/1983 | Harding | |
| 4,762,253 A | 8/1988 | Palmert | |
| 6,375,096 B1 * | 4/2002 | Rashidi | ................. B01F 13/002 239/413 |
| 2005/0035220 A1 * | 2/2005 | Brown | .................. B05B 7/0408 239/432 |

* cited by examiner

*Primary Examiner* — Alexander M Valvis
*Assistant Examiner* — Tuongminh N Pham
(74) *Attorney, Agent, or Firm* — Merchant & Gould P.C.

(57) ABSTRACT

The present invention provides a foam dispenser having a twice automatic cleaning function that automatically discharges a compressed air toward a mixing chamber, when releasing a pulled trigger lever, thereby improving convenience of work and providing economic advantages. The foam dispenser having a twice automatic cleaning function includes a main body 4 including a hose connection unit 34 and an air hose connector 42, a coupling end part formed at the other end thereof, a pair of fluid passageways 20, an air passageway 22, and a handle 3; a dispensing nozzle 6 connected to the coupling end part of the main body 4, has a mixing chamber 64; a separate-fluid supply unit 8 provided inside the main body 4 to open or close the fluid passageways 20; and an automatic cleaner 10 provided at a middle portion of the air passageway 22 to automatically open the air passageway 22.

7 Claims, 6 Drawing Sheets

FOAM DISPENSER HAVING TWICE AUTOMATIC CLEANING FUNCTION

BACKGROUND OF THE INVENTION

1. Field of the Invention

The present invention relates to a foam dispenser having a twice automatic cleaning function, and more particularly, to a foam dispenser having a twice automatic cleaning function that automatically discharges a compressed air toward a mixing chamber, when releasing a pulled trigger lever in order to stop an operation of the foam dispenser, such that it is possible to reliably prevent fluids from being hardened in the mixing chamber, and thereby improving convenience of work and providing economic advantages.

2. Description of the Related Art

As is well known, in a construction field, a heat insulation material is a material that performs partial heat insulation in a small area or gap, as well as entire heat insulation in a large-area. As a typical heat insulation material, there is a curable urethane foamed material.

A manual gun-type dispenser for injecting and dispensing a curable urethane foamed material is known in the art. In such a dispenser, separate fluid components are supplied to the dispenser, respectively, and after passing through respective control valves, the fluid components reach a mixing chamber of a dispensing nozzle to contact and mix with each other. The mixed fluid components are dispensed through the dispensing nozzle as a foamed material.

Examples of such a gun-type dispenser are disclosed in U.S. Pat. Nos. 4,311,254 and 4,399,930 issued to Harding Gary and U.S. Pat. No. 4,762,253 issued to Palmert Steven.

Hereinafter, two fluid components will be referred to as a resin A and a resin B, respectively. These resins are usually composed of a polymeric isocyanate and polyol amine, respectively. These components are respectively contained in two pressure vessels connected to fluid inlets of the dispenser through hoses.

When the two fluid components, i.e. the resins are mixed, a mixture thereof is quickly hardened to form a rigid foamed product which is very difficult to remove from a surface with which the mixture is in contact, and is substantially insoluble. Thus, the dispensing nozzle, in which the two fluid components are first mixed, is typically designed to be replaceable and disposable to eliminate a necessity of cleaning the dispensing nozzle.

However, since other works other than the foaming construction are generally carried out in the building insulation construction, two fluids may become mixed and hardened in the mixing chamber. Thereby, there is a problem that the dispensing nozzle or a coupling part of the dispensing nozzle becomes clogged.

If the dispensing nozzle or the coupling part of dispensing nozzle is clogged, a separate cleaning solvent may be used to melt the hardened portion. However, there are problems that the cleaning process is very cumbersome and results in extending an entire work time.

In particular, when cleaning the mixing chamber by using the cleaning solvent immediately after the dispensing work, the cleaning work can be continued even if it is troublesome. However, when taking a break during the dispensing work or when getting a phone call, it may be unconsciously forgotten to perform the work for cleaning immediately. At this time, when the dispensed fluid becomes solidified and the dispensing nozzle is clogged, there is a problem of requiring the cleaning work for a considerably long period of time.

Therefore, in such a case, the dispenser is often disposed of so as to decrease the construction time.

SUMMARY OF THE INVENTION

In consideration of the above-mentioned circumstances, it is an object of the present invention to provide a foam dispenser having a twice automatic cleaning function that automatically discharges a compressed air toward a mixing chamber, when releasing a pulled trigger lever in order to stop an operation of the foam dispenser, such that it is possible to reliably prevent fluids from being hardened in the mixing chamber, and thereby improving convenience of work and providing economic advantages.

To achieve the above object, according to a preferred embodiment of the present invention, there is provided a foam dispenser having a twice automatic cleaning function configured to dispense pressurized separate fluids, the foam dispenser including: a main body including a hose connection unit and an air hose connector which are formed at one end thereof and are connected to a supply source of the pressurized separate fluids and an air supply source through hoses, respectively, a coupling end part formed at the other end thereof, a pair of fluid passageways formed therein in a longitudinal direction through which the pressurized separate fluids flow, an air passageway formed therein through which compressed air flows, and a handle formed at a lower portion thereof; a dispensing nozzle which is connected to the coupling end part of the main body, has a mixing chamber in which the fluid passageways and the air passageway are joined, and is configured to dispense the pressurized separate fluids mixed in the mixing chamber; a separate-fluid supply unit provided inside the main body and configured to open or close the fluid passageways by an operation of a trigger lever; and an automatic cleaner provided at a middle portion of the air passageway, and configured to automatically open the air passageway for a predetermined period of time, when the trigger lever is pulled or released, so that the pressurized separate fluids remaining in the mixing chamber are discharged to an outside of the dispensing nozzle.

Preferably, the automatic cleaner includes: a switching chamber formed in the middle portion of the air passageway in a direction perpendicular thereto; a valve switching unit installed inside the switching chamber to reciprocate in the longitudinal direction thereof; and a connecting rod whose one end is connected to the trigger lever by a pin and the other end is connected to the valve switching unit to transmit a pressing force of the trigger lever to the valve switching unit to reciprocate the same, wherein, when the trigger lever is pulled or released, the valve switching unit opens the air passageway for a predetermined period of time.

Preferably, the automatic cleaner is installed inside the main body or the handle.

Preferably, the main body further includes a dispensing nozzle holder formed at a front upper end portion thereof to be engaged to a protrusion formed at a rear upper end portion of the dispensing nozzle.

Preferably, the separate-fluid supply unit includes: communication valves movably installed in the fluid passageways, which are formed in a tube shape whose rear end is opened and front end is closed, and have a closed pin protruding from a front center thereof, and fluid discharge holes penetrated at a front outer circumference thereof, respectively; springs mounted in the respective fluid passageways to press the communication valves forward; and O-rings coupled to front and rear outer peripheries of the communication valve, respectively.

Preferably, the hose connecting unit includes: a pair of hose connecting ends formed at one end thereof, to which the hoses for connecting the supply source of the pressurized separate fluids are connected, respectively; a pair of discharge ends formed at the other end thereof to discharge the separate fluids introduced into the hose connection ends to the fluid passageways; and dispensing amount adjusting screws inserted into both ends of a body thereof to which the hose connecting ends and the discharge ends are coupled, and configured to adjust a dispensing amount of the discharged separate fluids depending on an insertion depth thereof.

Preferably, the valve switching unit includes: an opening portion c provided at a center thereof so that the air passageway is maintained in an opened state for a predetermined period of time during pulling or releasing of the trigger lever; and first and second closing portion arranged side by side on both sides of the opening portion.

Preferably, the opening portion has a through hole formed therein, through which the pressurized air passes, and the through hole has a shape whose lower end is wide and upper end is narrow so as to be gradually decreased toward the upper end.

In accordance with the foam dispenser having a twice automatic cleaning function according to the present invention, a high-pressure air is automatically supplied to the mixing chamber immediately before and after dispensing due to an operation of pulling the trigger lever and an operation of releasing the trigger lever without the need for consciously thinking of the task, such that it is possible to prevent separate fluids in the mixing chamber from being solidified at all times. Therefore, a delay in the work time is prevented, thereby convenience of the work is increased, and economic advantages are improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail with reference to the accompanying drawings.

Figure 1:
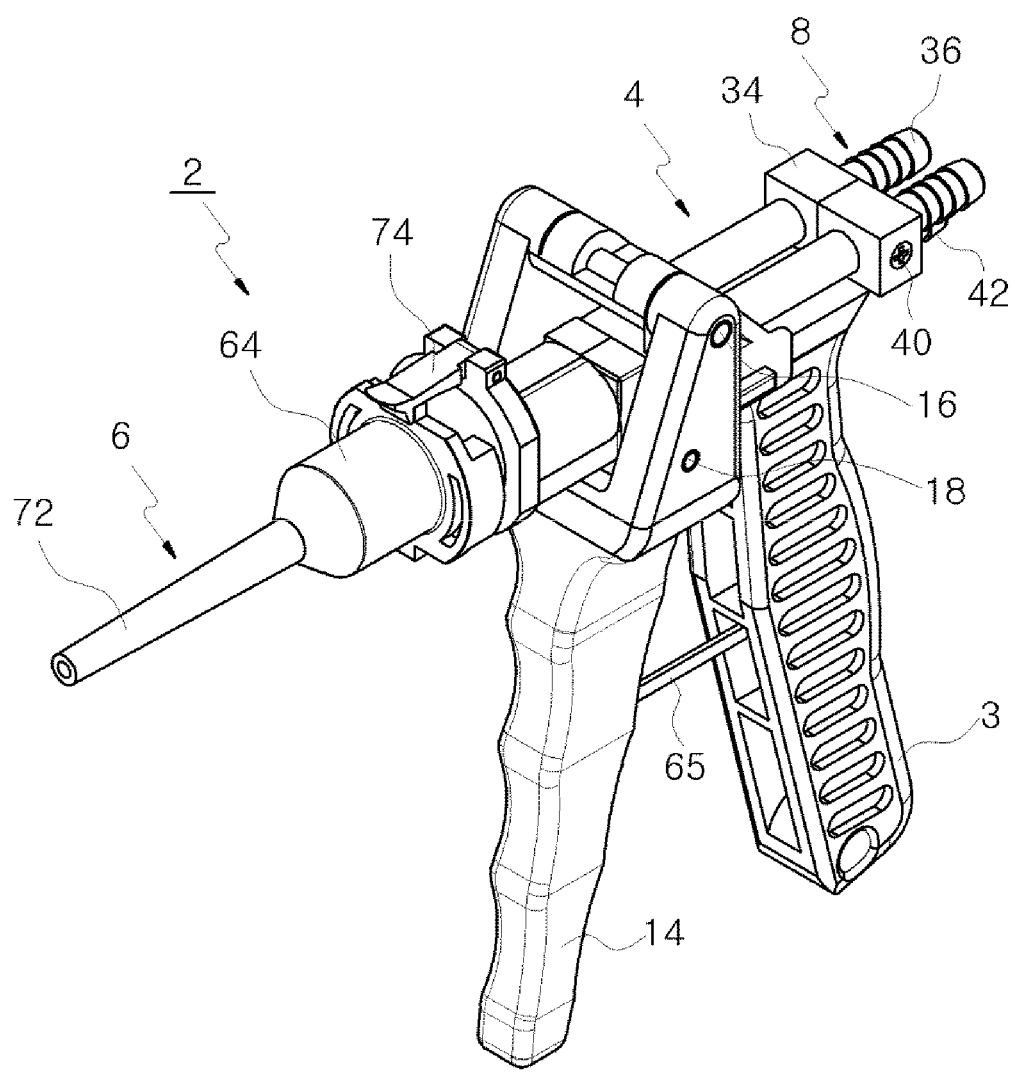
FIG. 1 is a perspective view illustrating an appearance of a foam dispenser having a twice automatic cleaning function according to an embodiment of the present invention.
Figure 2:
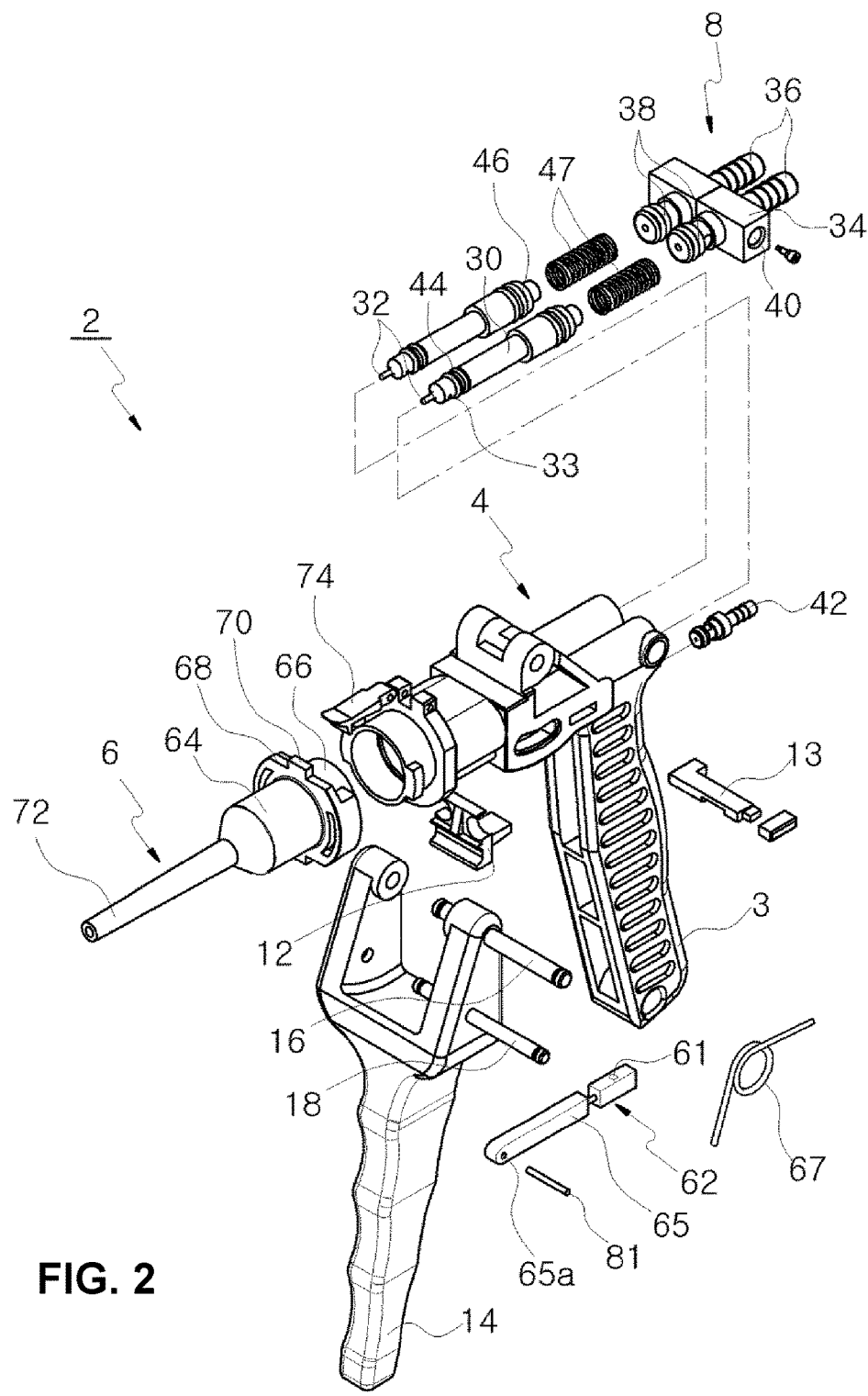
FIG. 2 is an exploded perspective view illustrating a configuration of the foam dispenser having a twice automatic cleaning function according to the embodiment of the present invention.
Figure 3:
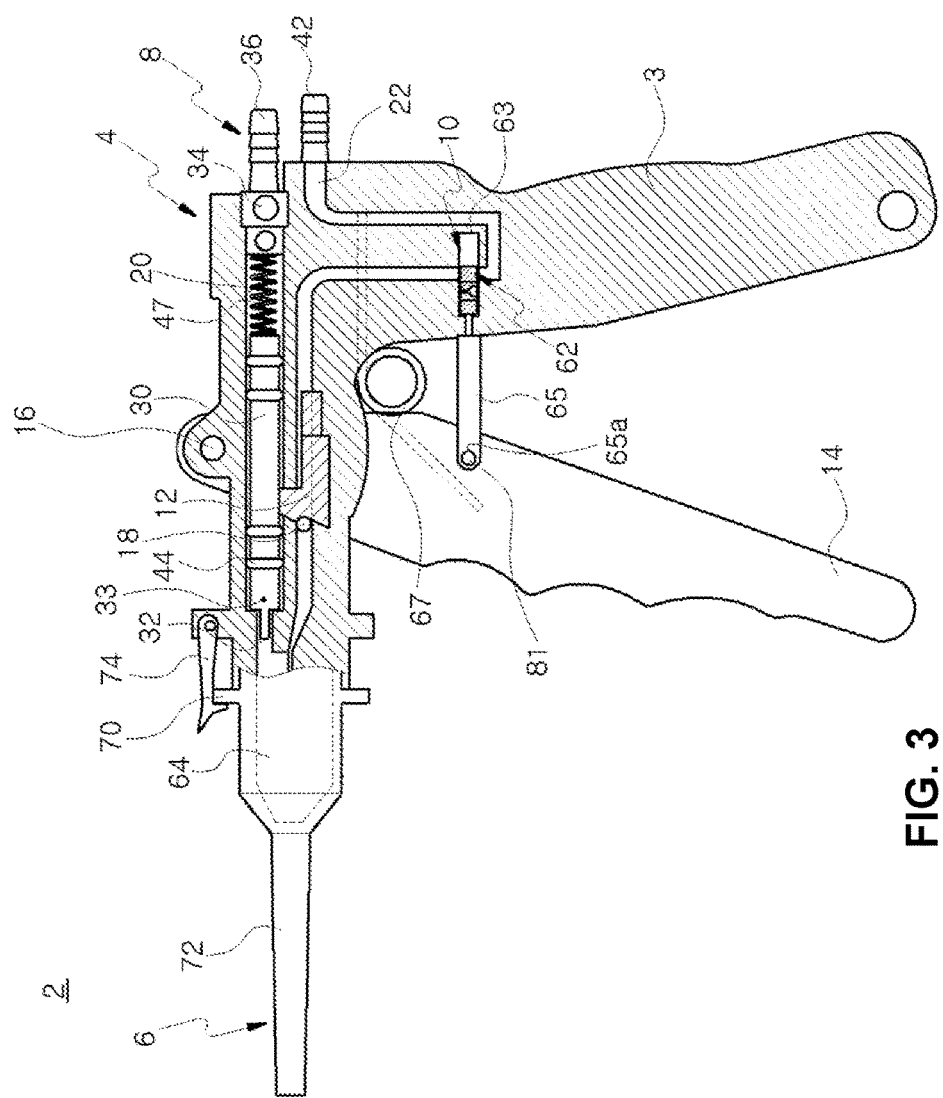
FIG. 3 is a side cross-sectional view illustrating the configuration of the foam dispenser having a twice automatic cleaning function according to the embodiment of the present invention.
Figure 4A:
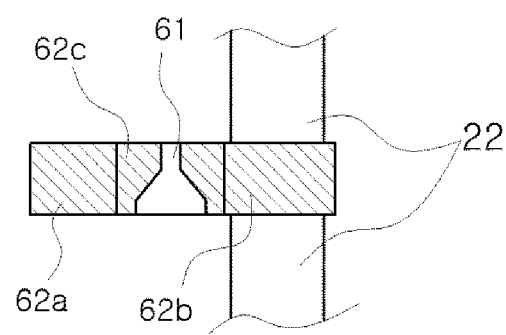
FIGS. 4A, 4B and 4C are diagrams schematically illustrating operation states of the foam dispenser having a twice automatic cleaning function according to the embodiment of the present invention.
Figure 4B:
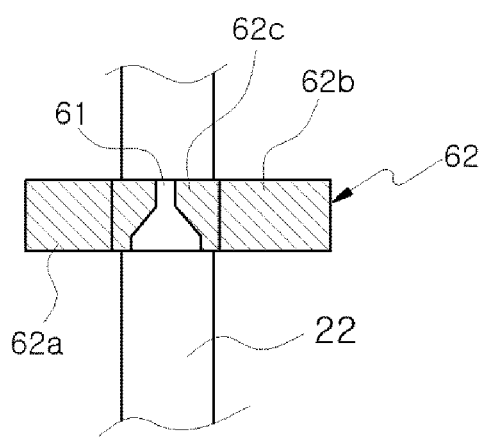
Figure 4C:
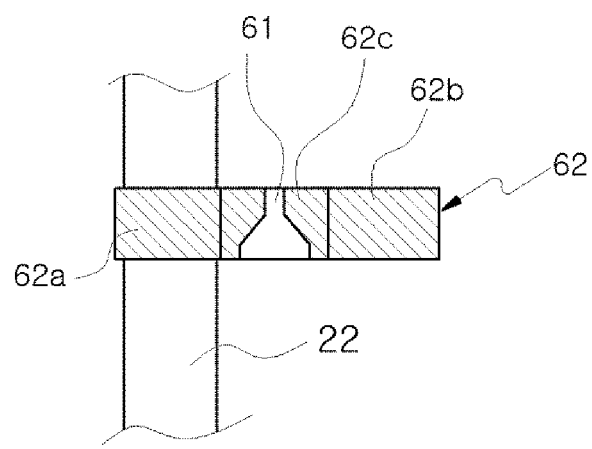

FIG. 1 is a perspective view illustrating an appearance of a foam dispenser having a twice automatic cleaning function according to an embodiment of the present invention, FIG. 2 is an exploded perspective view illustrating a configuration of the foam dispenser having a twice automatic cleaning function according to the embodiment of the present invention, FIG. 3 is a side cross-sectional view illustrating the configuration of the foam dispenser having a twice automatic cleaning function according to the embodiment of the present invention, and FIGS. 4A, 4B and 4C are diagrams schematically illustrating operation states of the foam dispenser having a twice automatic cleaning function according to the embodiment of the present invention.

Referring to these drawings, a foam dispenser 2 having a twice automatic cleaning function according to the embodiment of the present invention automatically discharges a compressed air toward a mixing chamber, when releasing a pulled trigger lever in order to stop an operation of the foam dispenser, such that it is possible to reliably prevent fluids from being hardened in the mixing chamber, and thereby increasing convenience of the work and improving economic advantages.

More specifically, the foam dispenser 2 having a twice automatic cleaning function according to the embodiment of the present invention includes a main body 4. The main body 4 includes a hose connection unit 34 and an air hose connector 42 which are formed at one end thereof and are connected to a supply source of the pressurized separate fluids and an air supply source through hoses, respectively, a coupling end part formed at the other end thereof, a pair of fluid passageways 20 formed therein in a longitudinal direction through which the pressurized separate fluids flow, an air passageway 22 formed therein through which compressed air flows, and a handle 3 formed at a lower portion thereof.

That is, the foam dispenser 2 having a twice automatic cleaning function according to the embodiment of the present invention has a configuration in which two separate fluids are filled in separate containers, respectively, and in this state, when operating the foam dispenser by a user, the separate fluids are dispensed to a front by mixing with each other in a mixing chamber as described below, and when temporarily stopping the dispensing, a compressed air is automatically discharged toward the mixing chamber at the time of stopping the dispensing so as to prevent the mixed fluid from being easily hardened. In this closure, the front refers to a direction in which the separate fluids are dispensed, that is, a left side in FIGS. 1 and 2, and a rear refers to a direction opposite thereto.

The foam dispenser 2 having a twice automatic cleaning function according to the embodiment of the present invention includes: a dispensing nozzle 6 which is connected to the coupling end part of the main body 4, has a mixing chamber 64 in which the fluid passageways 20 and the air passageway 22 are joined, and is configured to dispense the pressurized separate fluids mixed in the mixing chamber 64; and a separate-fluid supply unit 8 provided inside the main body 4 and configured to open or close the fluid passageways 20 by an operation of a trigger lever 14.

The foam dispenser 2 having a twice automatic cleaning function according to the embodiment of the present invention includes an automatic cleaner 10 provided at a middle portion of the air passageway 22, and is configured to automatically open the air passageway 22 for a predetermined period of time, when the trigger lever 14 is pulled or released, so that the pressurized separate fluids remaining in the mixing chamber 64 are dispensed to an outside of the dispensing nozzle 6.

That is, the foam dispenser 2 having a twice automatic cleaning function according to the embodiment of the present invention includes the dispensing nozzle 6 which is connected to the coupling end part of a front end of the main body 4, and has the mixing chamber 64 in which the fluid passageways 20 and the air passageway 22 are joined. In such a configuration, the main body 4 further includes a dispensing nozzle holder 74 formed on a front upper end thereof to engage the dispensing nozzle 6.

In addition, the dispensing nozzle 6 includes the mixing chamber 64 formed in a cylindrical shape at a rear end thereof, a front end portion 72 formed in a funnel shape at the front of the mixing chamber 64 to be communicated therewith, and a protrusion 70 formed at a rear upper end portion of the dispensing nozzle 6 corresponding to the mixing chamber 64, to which a hook formed at a front end of the dispensing nozzle holder 74 is engaged.

The dispensing nozzle 6 has a connecting portion 66 formed in a cylindrical shape at the rear end thereof to be fitted into the front end of the main body 4, and an engage jaw 68 formed on an outer circumference thereof.

On the other hand, the main body 4 has a trigger 12 operated by the trigger lever 14 which is pulled by a user's finger. The trigger lever 14 is pivotally coupled to the main body 4 by a hinge 16 provided at the upper end thereof. A spring 67 for providing an elastic restoring force to the trigger lever 14 is mounted on an outer periphery of the hinge 16, and a contact pin 18 for pressing the trigger 12 rearward is installed at a lower portion thereof.

Meanwhile, a safety pin 13 is installed at a predetermined portion of the main body 4 in such a manner of being inserted and protruding in a lateral direction. In order to prevent an accidental movement of the trigger lever 14, the safety pin 13 is coupled to the rear end of the trigger 12 to limit the movement of the trigger 12 within a predetermined range.

Further, the automatic cleaner 10 includes: a switching chamber 63 formed in a middle portion of the air passageway 22 in a direction perpendicular thereto; a valve switching unit 62 installed inside the switching chamber 63 to reciprocate in the longitudinal direction thereof; and a connecting rod 65 whose one end is connected to the trigger lever 14 by a pin 81 inserted in a hole 65a formed in one end thereof and the other end is connected to the valve switching unit 62 to transmit a pressing force of the trigger lever 14 to the valve switching unit 62 to reciprocate the same, wherein, when the trigger lever 14 is pulled or released, the valve switching unit 62 opens the air passageway 22 for a predetermined period of time.

Since the foam dispenser is used in an environment in which dusts and sands are blown in the wind at a construction site, foreign matters may be introduced into the mixing chamber 64 through an inlet of the dispensing nozzle 6. Therefore, in the present invention, it is preferable that the foam dispenser automatically performs the cleaning of the mixing chamber 64 not only when temporarily stopping dispensing of the separate fluids, but also when attempting to start the dispensing thereof.

In addition, it is sufficient that the cleaning of the mixing chamber 64 is performed by air injection for a predetermined period of time, preferably for a short time of about 1 second.

For this purpose, the valve switching unit 62 includes: an opening portion 62c provided at a center thereof so that the air passageway 22 is maintained in an opened state for a predetermined period of time during pulling or releasing of the trigger lever 14; and first and second closing portions 62a and 62b arranged side by side on both sides of the opening portion 62c.

The opening portion 62c has a through hole 61 formed in a shape such as a triangle or a bottle, whose lower end is wide and upper end is narrow. That is, the opening portion 62c has the through hole 61 formed therein, through which the pressurized air passes, and the through hole 61 has a shape whose lower end is wide and upper end is narrow so as to be gradually decreased toward the upper end. When the through hole 61 is positioned in the air passageway 22, the air passageway 22 is opened and the pressurized air flows toward the mixing chamber 64 through the through hole 61 of the air passageway 22.

Preferably, first and second closing portions 62a and 62b are arranged side by side on both sides of the opening portion 62c. In this configuration, the opening portion 62c is selectively opened corresponding to the operation of the trigger lever 14. That is, in a state in which the trigger lever 14 is pulled to a middle level, the opening portion 62c is positioned in the air passageway 22 to open the passageway.

However, since the trigger lever 14 normally protrudes forward by the elastic restoring force of the spring 67, when the user pulls the trigger lever 14 backward in order to dispense the separate fluids, the trigger lever 14 may pass a position in which the trigger lever 14 is pulled to the middle level. Also, when the user pulls the trigger lever 14 and then releases the lever, the trigger lever 14 may pass the position in which the trigger lever 14 is pulled to the middle level.

Therefore, the foam dispenser according to the present invention automatically cleans the mixing chamber 64 not only when temporarily stopping the dispensing of the separate fluids, but also when attempting to start the dispensing thereof.

More specifically, the valve switching unit 62 of the present invention is positioned in the air passageway 22 in a manner as illustrated in FIG. 4A. In this state, when the user slowly pulls the trigger lever 14, as illustrated in FIG. 4B, the through hole 61 of the opening portion 62c is positioned in the air passageway 22 to allow the compressed air to be injected into the mixing chamber 64.

In this state, when the user further pulls the trigger lever 14, the first closing portion 62a is positioned in the air passageway 22 as illustrated in FIG. 4C to prevent the supply of the compressed air. At the same time, the trigger 12 is operated to supply the separate fluids into the mixing chamber 64.

Such a structure of dispensing the separate fluids is well known in the art.

In this state, the dispensing operation of the separate fluids using the foam dispenser is performed. When the user releases the pulled trigger lever 14 in order to take a break or perform another work, the trigger lever 14 is moved forward from the rear.

At the same time, the valve switching unit 62 is also moved forward, such that the first closing portion 62a is moved forward in the air passageway 22, and then the opening portion 62c connected thereto passes through the air passageway 22. At that moment, the high-pressure compressed air is supplied through the through hole 61. The supplied air is discharged to the mixing chamber 64 to perform cleaning of the same.

Next, when the trigger lever 14 is fully moved forward, the valve switching unit 62 is also fully moved forward. At this time, the second closing portion 62b provided in the valve switching unit 62 is positioned in the air passageway 22 as illustrated in FIG. 4A to prevent the supply of the compressed air.

Therefore, in the foam dispenser 2 having a twice automatic cleaning function according to the embodiment of the present invention, cleaning of the mixing chamber 64 may be automatically performed during the separate-fluid dispensing operation in which the trigger lever 14 is pulled and then released without the need for consciously thinking of the task. In particular, the automatic cleaning is performed once immediately before and after the dispensing, respectively, that is, twice during the entire dispensing process.

Meanwhile, the automatic cleaner 10 may be installed inside the main body 4 or may be installed inside the handle 3. So long as the operation principle and function are the same, the installation position thereof may be freely changed.

Meanwhile, the structure of dispensing the separate fluids is a structure well-known in the art, but will be briefly described below. The separate-fluid supply unit 8 includes: communication valves 30 movably installed in the fluid passageways 20, which are formed in a tube shape whose rear end is opened and front end is closed, and have a closed pin protruding from a front center thereof, and fluid discharge holes penetrated at a front outer circumference thereof, respectively; springs 47 mounted in the respective fluid passageways 20 to press the communication valves 30 forward; and O-rings 44 coupled to front and rear outer peripheries of the communication valve 30, respectively.

The communication valve 30 includes first and second O-rings 44 and 46 which are respectively coupled to the front and rear outer circumferences thereof.

The hose connecting unit 34 includes: a pair of hose connecting ends 36 formed at one end thereof, to which the hoses for connecting the supply source of the pressurized separate fluids are connected, respectively; a pair of discharge ends 38 formed at the other end thereof to discharge the separate fluids introduced into the hose connection ends 36 to the fluid passageways 20; and dispensing amount adjusting screws 40 inserted into both ends of a body thereof to which the hose connecting ends 36 and the discharge ends 38 are coupled, and configured to adjust a dispensing amount of the discharged separate fluids depending on an insertion depth thereof.

That is, the communication valve 30 is moved rearward by the trigger 12, and is moved forward by the elastic restoring force of the spring 47. The communication valve 30 has a hollow tube shape, and is configured so that the separate fluids supplied through the hose connection unit 34 are respectively introduced into the mixing chamber 64, and the introduced fluids are discharged to an outside of the communication valve 30 through the fluid discharge holes 33 formed in the outer circumference of the front end of the communication valve 30.

The high-pressure fluids discharged through the fluid discharge holes 33 formed in the outer circumference of the front end of the communication valve 30 are introduced into the mixing chamber 64 to be mixed therein. Thereafter, the curable fluids mixed in the mixing chamber 64 are dispensed through the dispensing nozzle 6 to an outside thereof.

When an operator continues to pull the trigger lever 14, the mixed curable fluids are constantly dispensed through the dispensing nozzle 6.

While the foam dispenser having a twice automatic cleaning function according to the embodiment of the present invention has been described, the present invention is not limited to the above-described specific embodiment, and it will be understood by those skilled in the related art that various modifications and variations may be made therein without departing from the scope of the present invention as defined by the appended claims.

DESCRIPTION OF REFERENCE NUMERALS

4: main body, 6: dispensing nozzle
8: separate-fluid supply unit, 10: automatic cleaning unit
12: trigger, 14: trigger lever
16: hinge, 18: contact pin
22: air passageway, 30: communication valve
32: closing pin, 33: fluid discharge hole
34: hose connecting unit, 36: hose connecting end
40: dispensing amount adjusting screw, 42: air hose connector
61: through hole, 62: valve switching unit
63: switching chamber, 64: mixing chamber
68: engaging jaw, 70: projection
72: front end portion, 74: dispensing nozzle holder

What is claimed is:

1. A foam dispenser having a twice automatic cleaning function configured to dispense pressurized separate fluids, the foam dispenser comprising:

a main body including hose connector and an air hose connector which are formed at one end thereof and are connected to a supply source of the pressurized separate fluids and an air supply source through hoses, respectively, a coupling end part formed at the other end thereof, a pair of fluid passageways formed therein in a longitudinal direction through which the pressurized separate fluids flow, an air passageway formed therein through which compressed air flows, and a handle formed at a lower portion thereof; a dispensing nozzle which is connected to the coupling end part of the main body, has a mixing chamber in which the fluid passageways and the air passageway are joined, and is configured to dispense the pressurized separate fluids mixed in the mixing chamber;

a separate-fluid supply assembly provided inside the main body and including at least one communication valve configured to open or close the fluid passageways by an operation of a trigger lever; and an automatic cleaner provided at a middle portion of the air passageway, and configured to automatically open the air passageway for a predetermined period of time, when the trigger lever is pulled or released, so that the pressurized separate fluids remaining in the mixing chamber are discharged to an outside of the dispensing nozzle, wherein the automatic cleaner comprises:

a switching chamber formed in the middle portion of the air passageway in a direction perpendicular thereto;

a valve switch installed inside the switching chamber to reciprocate in the longitudinal direction thereof: and a connecting rod whose one end is connected to the trigger lever by a pin and the other end is connected to the valve switch to transmit a pressing force of the trigger lever to the valve switch to reciprocate the same, wherein, when the trigger lever is pulled or released, the valve switch opens the air passageway for a predetermined period of time.

2. The foam dispenser according to claim 1, wherein the automatic cleaner is installed inside the main body or the handle.

3. The foam dispenser according to claim 1, wherein the main body further comprises a dispensing nozzle holder formed at a front upper end portion thereof to be engaged to a protrusion formed at a rear upper end portion of the dispensing nozzle.

4. The foam dispenser according to claim 1, wherein the at least one communication valve is movably installed in the fluid passageways, the at least one communication valve formed in a tube shaped whose rear end is opened and front end is closed, and having a closed pin protruding from a front center thereof, and fluid discharge holes penetrated at a front outer circumference thereof, wherein the separate-fluid supply assembly further comprises:
at least one spring mounted to the fluid passageways to press the at least one communication valve forward; and
at least one O-ring coupled to front and rear outer peripheries of the at least one communication valve.

5. The foam dispenser according to claim 1, wherein the hose connector comprises:
a pair of hose connecting ends formed at one end thereof, to which the hoses for connecting the supply source of the pressurized separate fluids are connected, respectively;
a pair of discharge ends formed at the other end thereof to discharge the separate fluids introduced into the hose connection ends to the fluid passageways; and
dispensing amount adjusting screws inserted into both ends of a body thereof to which the hose connecting ends and the discharge ends are coupled, and configured to adjust a dispensing amount of the discharged separate fluids depending on an insertion depth thereof.

6. The foam dispenser according to claim 1, wherein the valve switch comprises:
an opening portion provided at a center thereof so that the air passageway is maintained in an opened state for a predetermined period of time during pulling or releasing of the trigger lever; and
first and second closing portions and arranged side by side on both sides of the opening portion.

7. The foam dispenser according to claim 6, wherein the opening portion has a through hole formed therein, through which the pressurized air passes, and the through hole has a shape whose lower end is wide and upper end is narrow so as to be gradually decreased toward the upper end.

\* \* \* \* \*